United States Patent [19]

Kneer

[11] Patent Number: 4,582,514
[45] Date of Patent: Apr. 15, 1986

[54] METHOD FOR THE REMOVAL OF GASEOUS, VOLATILE AND/OR LIQUID IMPURITIES FROM WASTE GASES

[75] Inventor: Franz X. Kneer, Eschenburg-Eibelshausen, Fed. Rep. of Germany

[73] Assignee: Gebrüder Weiss K.G., Dillinburg, Fed. Rep. of Germany

[21] Appl. No.: 622,539

[22] Filed: Jun. 20, 1984

[30] Foreign Application Priority Data

Jun. 23, 1983 [DE] Fed. Rep. of Germany ....... 3322688

[51] Int. Cl.⁴ .................................. B01D 53/08
[52] U.S. Cl. ................................. 55/71; 55/73; 55/79
[58] Field of Search ............. 55/71, 73, 74, 79, 316, 55/387; 71/9

[56] References Cited

U.S. PATENT DOCUMENTS

| | | | |
|---|---|---|---|
| 3,216,905 | 11/1965 | Baptist | 55/74 X |
| 3,828,525 | 8/1974 | Copa et al. | 55/74 X |
| 3,855,121 | 12/1974 | Gough | 55/73 X |
| 3,979,283 | 9/1976 | Prudom | 195/2 |
| 4,062,770 | 12/1977 | Kneer | 71/9 X |
| 4,161,426 | 7/1979 | Kneer | 55/74 X |
| 4,201,663 | 5/1980 | Rollag et al. | 55/73 X |
| 4,225,381 | 9/1980 | Ishikawa et al. | 55/73 X |
| 4,253,947 | 3/1981 | Fan et al. | 55/79 X |

FOREIGN PATENT DOCUMENTS

| | | | |
|---|---|---|---|
| 2445315 | 4/1976 | Fed. Rep. of Germany | 55/316 |
| 2605606 | 8/1977 | Fed. Rep. of Germany | 55/74 |
| 2558256 | 11/1978 | Fed. Rep. of Germany | . |
| 71372 | 6/1977 | Japan | 55/74 |
| 31565 | 3/1978 | Japan | 55/74 |

*Primary Examiner*—Robert Spitzer
*Attorney, Agent, or Firm*—Toren, McGeady, Stanger, Goldberg & Kiel

[57] ABSTRACT

A method for the continuous removal of gaseous or liquid impurities from waste gases from chemical industrial processing plants. The waste gases are passed upwardly through a closed vessel containing absorbent mass in the form of a biologically active material containing a quantity of *Actinomycetes globisporus* and acting as a substrate for microorganisms having an aerobic metabolism. A heap of absorbent mass is maintained in the vessel by removing absorbent mass from the bottom of the vessel and reintroducing the removed absorbent mass at the top of the vessel. Penicillium concentrate is added to the absorbent mass in order to reduce the content of halogenated impurities in the waste gases.

8 Claims, 1 Drawing Figure

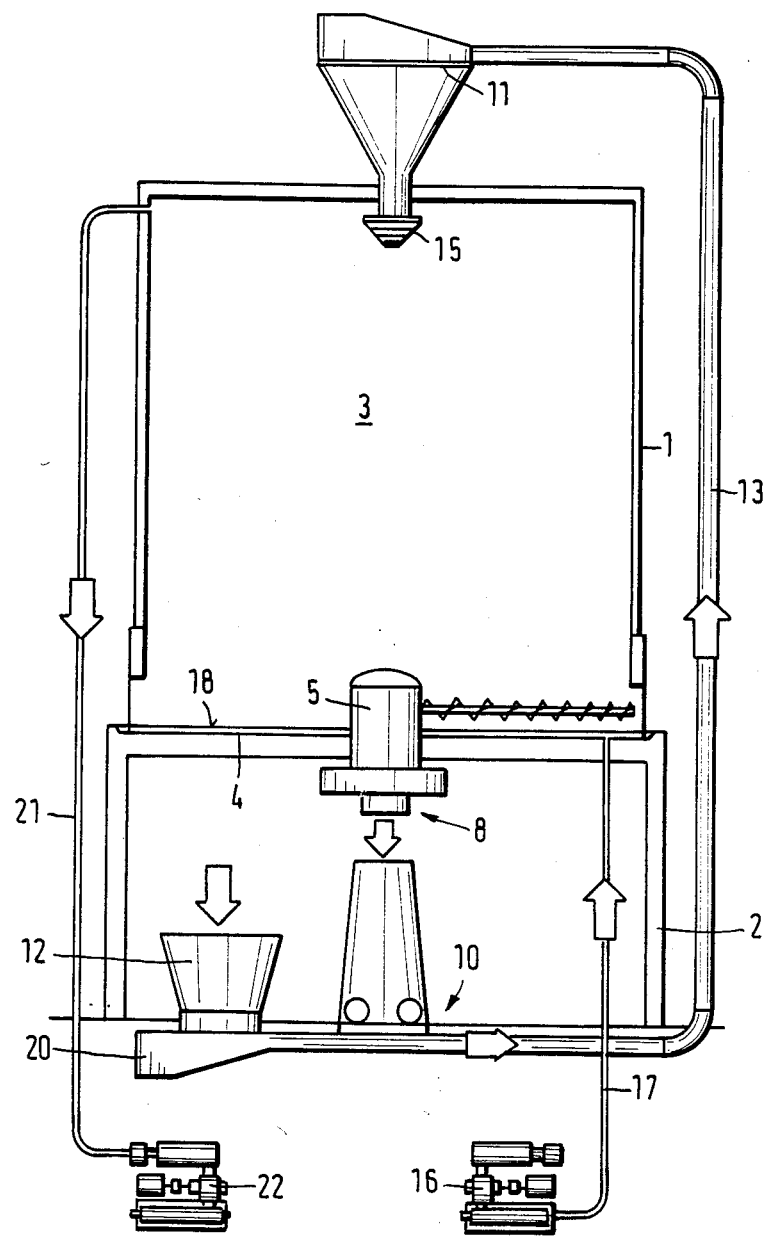

METHOD FOR THE REMOVAL OF GASEOUS, VOLATILE AND/OR LIQUID IMPURITIES FROM WASTE GASES

BACKGROUND OF THE INVENTION

1. Field of the Invention

The invention relates to a method for removing gaseous, volatile and/or liquid impurities from waste gases from industrial processing plants.

2. Description of the Prior Art

A device for carrying out such a method is disclosed in German Offenlegungsschrift No. 24 45 315 which utilizes, as an absorbent, compost from the incomplete decomposition of organic wastes.

Such devices, known as so-called "bio-filters", have in the past been utilized for filtering the outgoing or exhaust air from composting plants or composting partially drained domestic sludge, that is, for removing the organic impurities.

It has also been suggested to use bio-filters of this type for the removal of impurities from waste gases from industrial sewage treatment plants and industrial processing plants, particularly of the chemical industry. An analysis of waste gases from sewage treatment plants of the chemical industry, particularly of the pharmaceutical industry, has shown that such waste gases contain organic as well as inorganic gaseous, volatile and/or liquid impurities in the form of hydrogen sulfide, ammonia, ammonium compounds, thiols or aliphatics, cycloaliphatics or aromatic hydrocarbons. The impurities found most often in the waste gases are hydrogen sulfide, ammonia, ammonium compounds and thiols. The same impurities are contained in waste gases from the manufacture of penicillins and cephalosporins and from the purification of the sewage generated by this manufacture.

A long series of tests has now shown that the above-mentioned bio-filters are not suitable for the removal of these waste gases if the waste gases are to a substantial degree halogenated. It is possible that, in the biomass which is used as an absorbent, there develops a growth of microbes which effectively remove halogenated waste gas components as a result of natural selection after a period of months. However, such a development is merely accidental and cannot be used on a technical scale.

Therefore, it is the primary object of the invention to further develop the known method for the removal of impurities from waste gases in such a way that halogenated hydrocarbons are effectively removed and that the method can be utilized on a large industrial scale. This object is to be achieved without requiring long start-up periods for the microbiological processes in the biomass which is used as the absorbent.

SUMMARY OF THE INVENTION

The method, according to the present invention, provides for the continuous removal of gaseous or liquid impurities from waste gases from chemical industrial processing plants, wherein more than 25% by weight of the impurities are halogenated impurities in the form of aliphatic, cycloaliphatic or aromatic hydrocarbons. The waste gases are passed upwardly through a closed vessel containing absorbent mass in the form of a biologically active material containing a quantity of *Actinomycetes globisporus* and acting as a substrate for microorganisms having an aerobic metabolism. A heap of absorbent mass is maintained in the vessel by removing absorbent mass from the bottom of the vessel and reintroducing the removed absorbent mass at the top of the vessel. Penicillium concentrate is added to the absorbent mass in an amount of 5 to 15 $1/m^3$ of absorbent mass, the Penicillium concentrate having a concentration of $10^6$ to $10^7$ spores per milliliter.

The method, according to the invention, utilizes biologically highly active absorbent obtained on the basis of incompletely decomposed compost having a loose, friable texture with a porosity of about 20 to 50%. The absorbent has a water content of 30 to 70% by weight and a solid matter content of about 70 to 30% by weight, an organic substance content of about 30 to 70% by weight and a pH value (in water) from about 5.5 to 8. The absorbent is arranged in a closed vessel in the form of a heap of material whose height is maintained essentially constant by removing the lowermost layer of the heap of material from the vessel and reintroducing the removed material at the top of the heap of material, after fresh absorbent has been added to the material as necessary. The waste gases are conducted into the vessel in the bottom portion through a pipe system by means of a pressure blower and, after passing through the heap of material, are drawn off through an opening by means of a suction blower, so that the vacuum above the heap of material does not exceed about 0.07 bar.

Surprisingly, it has been shown that gas mixtures from industrial sewage treatment plants containing large amounts of halogenated impurities can be almost completely cleaned by conducting them through an absorbent into which a Penicillium concentrate has been injected in accordance with the invention. When the waste gases are conducted through the heap of material, the bacteria and microbes present in the material are stimulated to intensive activity. The halogenated mixed gases are converted and broken down as a result of the metabolic processes occurring in the heap of material, thereby causing a reduction of the quantity of the substrate.

When the portion of the halogenated impurities in the waste gases becomes too great, it is possible to maintain the required metabolic processes by adding readily decomposing substances. The amount of substances to be added must be limited, so that the purified waste gases emerging from the absorbent contain less than 150 milligrams of organic carbon per cubic meter.

It is an advantage of the present invention that the partial removal of the mixed waste gases obtained when using conventional absorbents, such as, low temperature carbonization cokes of peat coals, brown coals, anthracite or charcoal, and the rapid clogging of their porous surfaces by the air-borne particles or dust present in the waste gases, can now be completely eliminated.

Another important advantage of the present invention is that the absorbent discharged from the vessel can be further employed as compost. By means of the use of pressure blowers and suction blowers, not only the flow rate of the waste gases through the vessel, but also their partial pressure in the heap, can be controlled. In order to guarantee an uninterrupted removal of the impurities, the gas pressure must remain low despite a desired high throughput rate of the gas, because the microbes participating in the removal halt their activity during high gas pressures. The biological decomposition and conversion processes can be adapted to the quantities of waste gases introduced contained in the gases by adjusting through suitable controls into the vessel and the impurities the power of the input and output devices and of the pressure and suction blowers. As a result, optimum living conditions are maintained for the microorganisms settled in the absorbent, so that the microorganisms settled inside the absorbent can maintain their optimum living conditions and, thus, their full efficacy.

BRIEF DESCRIPTION OF THE DRAWING

The FIGURE is a schematic elevational view of the filter device according to the invention.

DETAILED DESCRIPTION OF THE INVENTION

As shown in the drawing, a vessel 1 is formed as a cylindrical metal housing provided with an insulating layer and stahding on a base 2. Located therein is a biologically highly active biomass in the form of a heap 3 as an absorbent. The biomass is composed, for example, of incompletely decomposed compost obtained through the decomposition of organic waste, for example, organic sewage sludge mixed with carbon carriers, which decomposition is controlled by means of the air feed, or of incompletely decomposed compost obtained from garbage. According to the characteristic features of the method set forth in German Auslegeschrift No. 25 41 070, the biomass obtained by this method exhibits a high biological activity of the microorganisms therein.

A Penicillium concentrate is injected into this biomass before it is filled into the metal housing. More specifically, 10 liters of a Penicillium concentrate containing a fungus of the species Penicillium (white) are added per cubic meter of biomass, the Penicillium concentrate having a concentration of $10^6$ to $10^7$ of spores per milliliter.

The vessel 1 has a floor surface 4 over which a discharge screw 5 can move which allows a uniform discharge from the vessel. The discharge screw is driven by a drive (not shown) which is movable about an axis, so that, in addition to its own movement about its longitudinal axis lying in the plane of the drawing, the discharge screw can slowly move in a clockwise direction over the vessel floor. In this manner, the screw 5 continuously moves the lowest layer of the material 3 towards a centrally located discharge opening 8 in the base of the vessel. The material which is removed falls onto a conveying device 10 which carries the material to a vertical conveying device 13 which, in turn, transports the material upwardly in the direction of the arrow to mixing funnel 11. Feed bin 12 also communicates with conveyor 10 so that fresh material may be admixed with the material exiting the vessel as desired. From funnel 11, the material optionally admixed with fresh material is distributed uniformly into the top of the vessel via a rotary distributor 15. Initially, of course, only fresh biomass is to be employed.

Via a schematically shown blower 16 and a conduit system 17, the waste gases or air to be purified are introduced into the bottom area of the vessel, that is, at its base, through nozzle system 18. The top of vessel 1 is closed. The air flowing through the heap of material is drawn out via outgoing air line 21 and suction blower 22. The flow rate of the air through the heap is adjusted by means of a conventional control device (not shown). In spite of a large throughput of waste gases to be purified, the gas pressure in the vessel must remain low. Ideally, the waste gas should only diffuse through the heap. Technically feasible is a vacuum above the heap up to about 0.07 bar at gas velocities from about 2 to 15, and preferably, 2 to 10 m/min, so that the dwell times of the waste gases in the heap of material are preferably at least 50 sec. A higher vacuum can lead to the danger of implosion of the vessel.

The actual dwell time of the air in the heap of material is determined as follows:

$$ta = \frac{A \times h \times P \times 3{,}600}{V \times 100} = (\text{sec}) \quad (1)$$

wherein
A = flow surface (m$^2$)
h = filling height (m)
P = porosity (%)
V = blown-in air quantity per hour (m$^3$/h).

Since the porosity, dependent on the respective grain size of the compost material used, varies in accordance with experience between about 20 and 50%, approximately 40% should be assumed as the mean value of the porosity which will then drop to approximately 30% through the weight of the material column in the vessel.

The air velocity V$_1$ to be adjusted follows from $$V_1 = \frac{V \times 100}{A \times P \times 60} = /(\text{m/min})$$

wherein
V = blown-in air quantity (m$^3$/h)
A = flow surface (m$^2$)
P = porosity.

The waste gases conducted into the vessel at the bottom are uniformly distributed over the cross-sectional area of the vessel and must flow upwardly through the heap of material which travels through the vessel downwardly and forms a filter bed of absorbent. The purification of the waste gases is effected by means of absorption and biological conversion with the absorbent. The absorption and biological conversion are biological processes which result in decomposition of the material in the heap and a consequent loss of material. This decomposition loss or decomposition decline is compensated for by adding fresh material containing Penicillium concentrate via the feed device 12 so that the vessel 1 is always completely filled with absorbent, thus always maintaining the same height of absorbent in the vessel. The absorbent throughput may be increased or decreased depending on the volume and the concentration of the waste gas impurities. Since the waste gases always flow from the bottom to the top, the lowest filter layer is always the most strongly loaded with impurities. The absorbent is discharged at this point and the discharged material, after fresh material containing Penicillium concentrate has been added, is again fed in at the top. In this manner, the lowermost layers of the heap of material which layers may be compacted due to dust-laden waste gases, are circulated so that clogging of the absorbent cannot take place as it does in prior art processes. Of course, the absorbent must be completely replaced after a certain period of time with new biomass containing Penicillium concentrate.

The vessel 1 can comprise a volume of approximately 10 to 200 m$^3$. Its filling height, that is, the height of the filter bed, is solely dependent on the lowest admissible limit of the porosity and the weight of the heap. In the present example, the filling height is approximately 6 m and the heap volume is 100 m³, resulting in a flow cross-section of approximately 15.9 m². In general, the volume is to be selected in accordance with the gas quantity and the type and amount of the impurities. This applies likewise to the rate of discharge and the feed of fresh biomass containing Penicillium concentrate. It is possible, in principle, to admix small or large amounts or no fresh biomass. The efficacy of the biomass can be determined by means of measurement probes, not shown, and the filtering process can be controlled accordingly by changing the throughput of the absorbent and admixture of fresh biomass containing Penicillium concentrate. Depleted biomass can also be removed near member 20 by means of conveying device 10.

Since many waste gases of the type which can be treated with the present process are 100% water saturated, the waste gas to be fed into the described filter device is to be passed through a water separator before feeding into the bio-filter.

The following example illustrates the invention:

EXAMPLE

Measurements of the waste gases of a so-called biological tower unit of an industrial sewage treatment plant after a start-up phase of the bio-filter of about 10 days.

I.

Material of the heap utilized as absorbent removed in the form of samples from vessel 1 after 14 days, and the types of microorganisms found in the material

| | |
|---|---|
| Volume of heap of bio-filter consisting of completely decomposed sewage sludge compost | = 100 m³ |
| Height | = 6.3 m |
| Water content | = 63.73% |
| Organic matter (dry basis) | = 69.2% |
| pH value (in water) | = 6.63 |

Samples were taken from the vessel at various points; the following microorganisms were positively identified:
Bacteria:
    *Actinomyces globisporus*
    *Micrococcus albus*
    *Micromonospora vulgaris*
    *Proteus vulgaris*
Fungi:
    Penicillium species (white)
    Cephalosporium species
    Mucor species
    *Circinella umbellata*
    Cephalothecium species
    · Ovularia species
    *Stemphylium piriforme*
Small Organisms:
    Mites
    Nematodes (Saprophytes).

Fungus of the type Penicillium (white) and bacteria of the type *Actinomyces globisporus* were each found to be widespread. The material of the samples had the typical smell of compost. This permits the conclusion that the amounts of chlorinated carbohydrates conducted into the vessel have been substantially reduced.

II.

Test Results

| | |
|---|---|
| Location of measuring point | = In waste gas chimney of bio-reactor |
| Diameter of measuring point | = 190 mm |
| Cross-sectional area of measuring point | = 0.0284 m² |
| Number of measuring axes | = 2 |
| Number of measuring points per measuring axis | = 1 |

The measuring point had the dimensions set forth in guideline VDI 2066.

The test was performed with waste gas from chemical industrial processing plants (Farbenfabriken Bayer, Werk Dormagen). A cubic meter of this waste gas contained on the average about 21 mg chloromethane, 69.5 mg dichloromethane, 250 mg dichloroethane, 47 mg xylene, 32.5 mg ethylbenzene, 5.5 mg chlorobenzene, 70.5 mg chlorotoluenes, and approximately 300 mg of impurities which were not analyzed in detail. The remaining portion of the waste gas consisted of the usual components of atmospheric air and other substances which are not among harmful impurities, such as water vapor. After this waste gas to be purified was conducted into the vessel for 14 days, the quantities of impurities contained in the waste gas to be purified and in the purified waste gas were measured at two separate measuring points by means of gas chromatography. The results are shown in the following table.

TABLE

| | Quantities in the non-purified waste gas (mg/m³) INPUT | | Quantities in the purified waste gas (mg/m³) OUTPUT | |
|---|---|---|---|---|
| Type of Impurity | Measuring Point 1 | Measuring Point 2 | Measuring Point 1 | Measuring Point 2 |
| Chloromethane | 21 | 21 | <3 | <3 |
| Dichloromethane | 69 | 70 | 20 | 20 |
| Dichloroethane | 250 | 250 | 130 | 120 |
| Xylenes | 46 | 48 | 10 | 10 |
| Ethylbenzene | 32 | 33 | 2 | 2 |
| Chlorobenzene | 5 | 6 | <2 | <2 |
| Chlorotoluenes | 68 | 73 | 16 | 15 |

It is apparent that the method, in accordance with the present invention, surprisingly makes possible a very efficient purification of waste gases which contain large quantities of halogenated impurities.

The purified waste gas does not constitute an environmental burden, as could be determined by a smelling test. This means that the impurities which were not analyzed in detail were also removed to a substantial extent.

What is claimed is:

1. A method for continuously removing gaseous or liquid impurities from waste gases from chemical industrial processing plants, wherein more than 25% by weight of the impurities are halogenated impurities in the form of aliphatic, cycloaliphatic or aromatic hydrocarbons, using an absorbent in the form of a biologically active compost containing a quantity of *Actinomycetes globisporus* retrieved from a biological decomposition process of organic wastes and/or sewage sludge, said compost being at least partially, but not completely decomposed, and forming a heap embedded in a vessel through which waste gas is passed from the bottom to the top, whereby said absorbent is fed to said vessel from above and guided down to its base and whereby spent absorbent is continuously replaced by fresh compost, by means of mechanical charging and discharging means, characterized through its application for continuous removal of inorganic, as well as organic gaseous, volatile and/or liquid impurities in the form of hydrogen sulfide, ammonia, ammonium compounds, thiols or halogenated or unhalogenated aliphatic, cycloaliphatic or aromatic hydrocarbons, wherein the waste gases fed to said vessel at its base via a pipeline system by means of a pressure fan are, after passing through said absorbent, suctioned off via an opening by means of a suction fan in such a way that a vacuum occurring above the heap does not exceed 0.07 bar, and wherein, moreover, the speed of suction and/or pressure fans are, for the purpose of adjusting the dwell time in said absorbent of said waste gases to be purified, be adjusted in such a way that dwell times of said waste gases in said absorbent of at least 50 seconds occur at gas speeds of 2 to 15 m/min., the most used layer of absorbent at the bottom of the vessel being conveyed and reintroduced as a top layer to said vessel, and the volume of the active absorbent in the vessel being maintained substantially constant by the admixture of fresh absorbent to the reintroduced portion of the absorbent in an amount equal to that consumed by the microorganisms and adding to said absorbent mass 5 to 15 liters of Penicillium concentrate per cubic meter of absorbent mass, said Penicillium concentrate having a concentration of $10^6$ to $10^7$ spores per milliliter.

2. The method of claim 1, wherein 9 to 11 liters of Penicillium concentrate are added per cubic meter of absorbent mass.

3. The method of claim 1, wherein fresh absorbent mass containing Penicillium concentrate is added as needed to said absorbent mass reintroduced at the top of said vessel, so that always the same height of absorbent is maintained in said vessel.

4. The method according to claim 1, further comprising adding a gaseous or liquid, readily decomposing substance to the waste gases before passing the waste gases through said absorbent mass, so that the purified waste gases emerging from the absorbent contain less than 150 milligrams of organic carbon per cubic meter.

5. The method according to claim 4, wherein said readily decomposing substance is selected from the group consisting of benzene, toluene, xylene, methanol, and ethanol.

6. The method of claim 4, wherein said readily decomposing substance is methyl acetate.

7. The method of claim 1, wherein the $O_2$ content of the waste gases passed through the absorbent mass is maintained to be at least 10% by volume.

8. The method of claim 1, wherein the waste gases passed through the absorbent mass are composed of a mixture of atmospheric air and spent organic solvents from chemical industrial plants containing more than 25% by weight halogenated impurities.

* * * * *